UNITED STATES PATENT OFFICE 2,479,761

PREPARATION OF GLYCOSIDES UTILIZING AZEOTROPIC DISTILLATION

Karl Miescher, Riehen, and Charles Meystre, Basel, Switzerland, assignors to Ciba Pharmaceutical Products Inc., Summit, N. J., a corporation of New Jersey No Drawing. Application October 12, 1944, Serial No. 558,467. In Switzerland December 28, 1943

7 Claims. (Cl. 260—210)

A number of processes for the manufacture of saccharide derivatives are known. One of the best known is that described for the first time by Königs and Knorr (Chem. Zentralblatt, 1900 II, 179) which consists of shaking up acylhalogeno-saccharides and alcohols in the presence of agents which combine with hydrogen halides e. g. silver carbonate or silver oxide. Even this process gives unsatisfactory yields, however, as the water which is formed during the reaction apparently reacts itself with the acylhalogeno-saccharides. In order to avoid this side-reaction it has been suggested that the reaction should be carried out in the presence of agents which combine with water, e. g. calcium chloride, calcium sulfate or calcium hydride. Only in some cases, however, was an increase in yield thus obtained.

It has now been found that better yields of saccharide derivatives of organic hydroxy compounds can surprisingly be obtained by the usual methods, in the presence of a solvent, if volatile cleavage products formed during the reaction are continually removed by azeotropic distillation.

Suitable organic hydroxy compounds are: any alcohols, particularly also hydroxy compounds of the steroid series, e. g. testosterone, androsterone, corticosterone, dehydrocorticosterone, desoxycorticosterone, estradiol and its mono-derivatives, and genins of synthetic or natural cardiac stimulants. Aliphatic or other alicyclic alcohols such as batyl alcohol, menthol, borneol, vitamins A and D may also be mentioned.

Any acylhalogeno-saccharide is particularly suitable for the said manufacture of saccharide derivatives. As agents which combine with hydrogen halide, e. g. silver oxide or silver carbonate can be used in usual manner. The reaction, however, can also be carried out in the presence of mercury salts, e. g. mercury acetate. In the latter case acetic acid is formed, which in the present process is continually removed by azeotropic distillation. Furthermore, partially or completely acylated sugars are suitable for the condensation with the hydroxy compounds, the reaction being carried out in the presence of p-toluene-sulfonic acid, zinc chloride, ferric chloride, etc. If desired the reactions can be carried out with the addition of a little iodine or the like.

The reaction is carried out in the presence of inert solvents which form azeotropic mixtures with the volatile cleavage products formed during the reaction, e. g. with water or with an organic acid. In particular solvents which are not miscible with water, e. g. methylene chloride, tetrachlorethylene, chloroform, benzene, toluene, alkyl acetates, isopropyl ether, etc. may be used. It is convenient to add one or both components of the reaction to the mixture containing the condensing agent as is seen to be required by the course of the reaction. According to the process the solvent is continually distilled off, at normal or at reduced or increased pressure, and in this way the water, etc. which is formed during the reaction is continually removed azeotropically. Thus the side-reactions previously observed are avoided to a large extent.

The following examples illustrate the invention, but are not to be regarded as limiting it in any way, the parts being by weight:

*Example 1*

5 parts of t-androsterone are dissolved in 200 parts of dry benzene, 8 parts of silver carbonate added, and the mixture heated to boiling. During the time that benzene distils off a solution of 18 parts of acetobrom-d-glucose in benzene is allowed to drop in slowly, stirring continually. After the reaction is complete, the silver salt is filtered off by suction, thoroughly washed with benzene, and the clear pale-yellow filtrate evaporated down in vacuo. The oily viscous residue is dissolved in ether and the β-d-glucoside-tetra-acetate of t-androsterone crystallises out, after standing for some time, in the form of needles. After 24 hours the crystals are filtered off under suction, washed with ether and recrystallised from alcohol. In this way 5.6 parts of glucoside-tetra acetate of t-androsterone, M. Pt. 192° C., are obtained.

The mother liquors which no longer crystallise are evaporated down, the residue dissolved in methyl alcohol, and a cold solution of sodium methylate (prepared from 3.9 parts of sodium and methyl alcohol) added in the cold. After 3 hours the mixture is neutralized with acetic acid, water added, and methyl alcohol evaporated off in vacuo at 30–35° C. bath temperature. After cooling the suspension obtained is filtered off under suction, the residue washed with cold water and dried in vacuo. The dried product is dissolved in acetone, the solution filtered, evaporated down and ether added, when free t-androsterone-β-d-glucoside crystallises out. The filtrate is again concentrated down and ether added, when more glucoside is precipitated. In this way a total of 2.7 parts of free glucoside are obtained. This crude product is recrystallized from a mixture of acetone and ether until it has a constant M. Pt. of 216–217° C. The total yield of glucoside and glucoside acetate is 85.8% of the theoretical value. K. Miescher, Ch. Meystre and J. Heer [Helv. Chim. Acta. 24, 990 (1941)], on the other hand, only obtained a yield of 43% without azeotropic distillation.

*Example 2*

5 parts of testosterone are allowed to react in benzene solution with 8 parts of silver carbonate and 18 parts of acetobrom-d-glucose, as described in Example 1. The silver salts are removed from the mixture by filtering off under suction and well washed with acetone. The filtrate is evaporated down in vacuo, the viscous residue dissolved in 50 parts of ether and the solution allowed to stand in the cold for 24 hours. The crystals which separate out (β-d-glucoside-tetraacetate of testosterone) are filtered off by suction and washed with ether. 3.84 parts are obtained. The crystals are dimorphous, melting first at 125–128° C., then crystallizing again in the form of long needles which finally melt at 163° C.

The mother liquors are evaporated down and the residue saponified in methyl alcohol solution as described in Example 1. After the methyl alcohol has been evaporated off in vacuo, the aqueous suspension obtained is filtered off and the brown, partly crystallized residue recrystallized from aqueous acetone, whereby 1.95 parts of testosterone are obtained. The mother liquors are then freed of acetone in vacuo, the aqueous suspension extracted with chloroform, the chloroform solution dried with sodium sulfate and evaporated down. In this way 1.75 parts of a viscous mass are obtained, which are reacetylated by means of acetic anhydride in pyridine. The residue obtained by evaporating down the solution is dissolved in ether, the solution washed with hydrochloric acid, sodium carbonate, and water, dried with sodium sulfate and evaporated down. 0.72 part of the β-d-glucoside-tetra-acetate of testosterone crystallizes out so that the total yield is 4.66 parts, or 43.2% of the theory. E. Rabald and H. Dietrich [Zeitschr. f. physiolog. Chemie, 259, 251 (1939)], on the other hand, obtained only 18.6%.

The reaction can also be carried out in the presence of silver oxide instead of silver carbonate. Toluene can be used instead of benzene as solvent.

*Example 3*

5 parts of cholesterol are caused to react with 6 parts of silver carbonate and with a solution of 13.3 parts of acetobrom-d-glucose in 300 parts of benzene as described in Example 1. After removing the silver salts from the reaction mixture and evaporating down the filtrate in vacuo, the residue is dissolved by heating in 300 parts of alcohol and the solution cooled to 20° C. For saponification, a solution of sodium in alcohol is added until there is a marked alkaline reaction. The glucoside of cholesterol separates out almost spontaneously. The precipitate is filtered off by suction, washed with alcohol and ether, and boiled with 100 parts of water. After cooling, the mixture is again filtered by suction and the residue washed with water. The latter is then dissolved in 50 parts of hot pyridine, the solution filtered hot and water added, when the cholesterol-β-d-glucoside crystallizes out. The filtration is best carried out with the addition of some ether and the residue washed with alcohol and ether. The yield of pure substance is 3.07 parts or 43.3% of the theory, whereas H. Lettré, and A. Hagedorn [Zeitschr. f. physiolog. Chemie, 242, 212 (1936)] give the yield of purified tetra-acetyl glucoside as 25.4%.

When working under diminished pressure in xylene as solvent and heating on the boiling water bath, the yield of pure substance is 3.28 parts or 46.2% of the theory. In this connection, it is advantageous first to drop in some acetobromglucose and then to heat for a short time until the evolution of carbon dioxide has begun. At the end of the reaction, heating is continued advantageously for another half hour in order to react also the remaining acetobrom-glucose.

*Example 4*

400 parts of absolute chloroform are added to 10 parts desoxycorticosterone and 13 parts of silver carbonate in a three-necked flask provided with a stirrer, a dropping funnel and a condenser in a slanting position; the solution is then brought to the boil. During the time in which chloroform is distilled off, a solution of 25 parts of acetobrom-d-glucose in 500 parts of absolute chloroform is allowed to drop in stirring continually. The whole is then heated for a further half hour. The silver salts are filtered off, washed with chloroform and the filtrate evaporated down in vacuo. The viscous residue is dissolved in 200 parts of ether and allowed to stand for at least 24 hours, whereby the β-d-glucoside-tetra-acetate of desoxycorticosterone crystallizes out, if necessary after addition of a crystal of the substance. In this way, after filtering off under suction, washing with ether, and drying, 6.6 parts of the glucoside acetate, M. Pt. 172° C., are obtained.

The ethereal mother liquors are extracted with dilute sodium bicarbonate solution and water, dried with sodium sulfate and completely evaporated down. For saponification the residue is dissolved in 1000 parts of dry methyl alcohol, 10 parts of an approximately 2N barium methylate solution added at −15° C., and the whole allowed to stand for 24 hours at this temperature. The barium ions are then precipitated with the calculated quantity of sulfuric acid. The barium sulfate is filtered off, the filtrate evaporated down in vacuo, and the viscous mass obtained extracted with hot water and ethyl acetate. The unchanged starting material goes into the ethyl acetate layer, whereas the free glucoside remains in the aqueous layer partly in the form of an oily suspension. The same quantity of alcohol is added to the suspension and the whole extracted several times with chloroform. After the chloroform extracts have been evaporated down, the residue is dissolved in 29 parts of pyridine and 20 parts of acetic anhydride, the solution allowed to stand for 20 hours and evaporated down in vacuo at 45° C. The residue is dissolved in ether and the ethereal solution quickly washed with hydrochloric acid and water, dried with sodium sulfate and evaporated down. In this way 2.2 more parts of the β-d-glucoside-tetra-acetate of desoxycorticosterone are obtained. The total yield is thus 8.8 parts or 44% of the theory. By saponification of this pure glucoside-acetate in the manner described before, pure desoxycorticosterone β-d-glucoside is obtained. After recrystallization from a mixture of methanol and acetone it melts at 190–195° C.

If the chloroform is replaced by benzene as solvent, the yield increases to 60% of the theory. K. Miescher, W. H. Fischer and Ch. Meystre

[Helv. Chim. Acta, 25, 41 (1941)] only obtained, on the other hand, 25%.

Example 5

10 parts of desoxycorticosterone in dry benzene are caused to react with a solution of 53 parts of acetobrom-maltose in the presence of 13 parts of silver carbonate in a manner analogous to that in Example 4. After filtration, the filtrate is evaporated down and dissolved in ether; 9.9 parts of desoxycorticosterone-maltoside-hepta-acetate separate out slowly and form nice crystals melting, after recrystallization from a mixture of acetone and ether, at 183–185° C.

After saponification of the mother liquors as in Example 4, the free β-maltoside of desoxycorticosterone is obtained first as a viscous mass which crystallizes after treating with alcohol. In this way 2 parts, melting at 232–235° C., are obtained. The total yield of free and esterified maltoside is 42.5%.

Example 6

3 parts of silver carbonate are heated to boiling with 30 parts of benzene. As the benzene is continually distilled off, a solution of 0.5 part of cis-borneol and 3.25 parts of acetobrom-glucose in 50 parts of benzene are allowed to drop in slowly. The mixture is heated for a further 15 minutes, filtered, and the filtrate evaporated down in vacuo. The unchanged cis-borneol is driven off with steam in vacuo and the residue obtained dried in vacuo. On recrystallization first from a mixture of alcohol and water and then from hexane, 0.87 part or 55.3% of the theoretical value of the tetra-acetyl glucoside of cis-borneol are obtained in needles which melt at 113–115° C. K. Miescher, Ch. Meystre and J. Heer [Helv. Chim. Acta, 24, 990 (1941)] obtained, on the other hand, a yield of 30.5%.

The reaction may also be carried out in presence of mercury salts, e. g. mercury acetate instead of silver carbonate.

Example 7

A solution of 19 parts of acetobrom-maltose in benzene is added drop by drop to 5 parts of estradiol-3-monobenzoate and 6 parts of silver carbonate in boiling benzene as described in the previous examples. The filtered solution is evaporated down in vacuo and the residue dissolved in alcohol. The β-maltoside-hepta-acetate of estradiol-3-monobenzoate soon crystallizes out. After 24 hours the crystals are filtered off under suction and washed with a little cold alcohol. 8 parts of almost pure substance are obtained. After recrystallization from alcohol, the maltoside melts at 227–229° C. The yield is 60.5% of the theoretical value.

In order to saponify this 17-(β-maltoside-hepta-acetate) of estradiol-3-monobenzoate, 4 parts thereof are brought together at low temperature with 200 parts of dry methyl alcohol and 5 parts of a normal methanolic solution of barium methylate. After standing for 20 hours, the barium ions are precipitated in the form of their sulfate, the precipitate is filtered off by suction, the filtrate evaporated in vacuo and the residue dissolved in methyl alcohol. After addition of some water to this solution the 17-β-maltoside of estradiol crystallizes; it is then filtered off by suction and recrystallized from aqueous methyl alcohol (50%). It melts at 272–282° C. under decomposition and forms beautiful conglomerates of plates, containing still 1 mol of water.

Example 8

A solution of 14 parts of acetobrom-glucose in benzene is added drop by drop to 5 parts of $\Delta^{5,6:20,22}$-3,21 - dihydroxy - nor - choladienic acid lactone and 8 parts of silver carbonate in boiling benzene as described in the previous examples. The filtered soltion is evaporated down in vacuo. The residue is dissolved in a little acetone, isopropyl ether added to the solution and the mixture concentrated down. A gelatinous precipitate is formed, which is filtered off by suction. By dissolving and recrystallization from a mixture of actone and isopropyl ether the glucoside tetraacetate of $\Delta^{5,6:20,22}$-3,21–diacetoxy-nor-chloadienic acid lactone is obtained in nice prisms which show the double melting point of 177–178° C. and 192–202° C. 3 parts are obtained and, after careful saponification of the mother liquors with barium methylate in methyl alcohol solution and reacetylation in a cold mixture of pyridine and acetic anhydride, further quantities are obtained.

The glucoside tetraacetate is saponified as described in the previous example with the aid of barium methylate solution. The product is freed of barium and recrystallized from a mixture of methyl alcohol and acetone. The glucoside of $\Delta^{5,6:20,22}$-3,21-dihydroxy-nor-choladienic acid lactone forms colorless crystals which melt undefinedly under decomposition between 258 and 272° C. They give a positive legal test and contain 1 mol of water.

Example 9

A solution of 49 parts of acetobrom-maltose in benzene is added drop by drop to 10 parts of $\Delta^{5,6:20,22}$-3,21-dihydroxy-nor-choladienic acid lactone and 20 parts of silver carbonate in boiling benzene as described in the previous examples. The residue of the evaporated solution is saponified by dissolving it in 2000 parts of dry methyl alcohol and adding at low temperature 50 parts of an N-barium-methylate solution. When the reaction is complete, the barium ions are precipitated with the calculated quantity of sulfuric acid. The filtrate is evaporated, the viscous mass is dissolved in 2000 parts of ethanol of 50 per cent strength and the solution thus obtained is extracted repeatedly with chloroform. The residue (17.7 parts) of the chloroform extracts, evaporated down in vacuo at 40° C., contains the free maltoside of $\Delta^{5,6:20,22}$-3,21-dihydroxy-nor-choladienic acid lactone.

For the purpose of purification it is re-acetylated at 20° C. with acetic anhydride in pyridine, chromatographed and finally recrystallized from ethanol. 5.7 parts of β-maltoside-hepta-acetate of $\Delta^{5,6:20,22}$-3,21-dihydroxy-nor-choladienic acid lactone of melting point 179–181° C. are thus obtained. The free maltoside can be obtained by saponifying this compound with methanolic barium methylate solution, the maltoside melting at 260–264° C. after recrystallization from methyl alcohol and acetone.

Example 10

5 parts of testosterone are reacted in a benzene solution with 8 parts of silver carbonate and 25 parts of acetobrom-maltose as described in Example 1. The silver salts are removed from the reaction mixture by suction-filtering and washed thoroughly with acetone. The filtrate is evaporated down in vacuo and the residue saponified by dissolving it in 750 parts of dry methyl alcohol and adding the solution at a low temperature to 10 parts of an N-barium-methylate solution in methyl alcohol. After 20 hours the barium ions are precipitated with the calculated quantity of sulfuric acid. The clear filtrate is evaporated in vacuo and the residue shaken out with ethyl acetate and water, the unchanged testosterone going into the ethylacetate and the maltoside and unreacted maltose into the aqueous solution. The same quantity of ethanol is added to the aqueous portion and extracted several times with chloroform. After evaporating in vacuo the chloroform extracts leave 2.7 parts of crude maltoside of testosterone behind.

For the purpose of purification the crude maltoside is first re-acetylated by dissolving it in 10 parts of pyridine, adding 7 parts of acetic anhydride to the solution and allowing it to stand for 15 hours at 20° C. The residue obtained by evaporating the solution in vacuo at 40° C. is dissolved in ether and the solution is washed with hydrochloric acid, sodium carbonate and water. After drying with sodium sulfate it is evaporated down, the residue is dissolved in ethanol and little water is added thereto. The β-maltoside-hepta-acetate of testosterone crystallizes in needles of melting point 175–180° C.

The free β-maltoside of testosterone of melting point 250–255° C. is obtained by saponifying the pure acetate with methanolic barium methylate solution.

What we claim is:

1. Process for the manufacture of saccharide derivatives, comprising converting an alcohol into a corresponding saccharide derivative by means of an acylhalogeno-saccharide in the presence of an inert solvent which forms azeotropic mixtures with the volatile cleavage products formed during the reaction, the volatile cleavage products which are formed during the reaction being continually and permanently removed from the reaction zone by azeotropic distillation.

2. Process for the manufacture of saccharide derivatives, comprising converting an alcohol into a corresponding saccharide derivative by means of an acylhalogeno-saccharide in the presence of an inert solvent which forms azeotropic mixtures with the volatile cleavage products formed during the reaction, and in the presence of an agent which binds hydrohalic acids, the volatile cleavage products which are formed during the reaction being continually and permanently removed from the reaction zone by azeotropic distillation.

3. Process for the manufacture of saccharide derivatives, comprising converting an alcohol into a corresponding saccharide derivative by means of an acylhalogeno-saccharide in the presence of an inert solvent which forms azeotropic mixtures with the volatile cleavage products formed during the reaction, and in the presence of an agent which binds hydrohalic acids, one component of the reaction being added to the mixture containing the said agent as required by the course of the reaction and the volatile cleavage products which are formed during the reaction being continually and permanently removed from the reaction zone by azeotropic distillation.

4. Process for the manufacture of saccharide derivatives, comprising converting an alcohol into a corresponding saccharide derivative by means of an acylhalogeno-saccharide in the presence of an inert solvent which forms azeotropic mixtures with the volatile cleavage products formed during the reaction, and in the presence of an agent which binds hydrohalic acids, both components of the reaction being added to the mixture containing the said agent as required by the course of the reaction and the volatile cleavage products which are formed during the reaction being continually and permanently removed from the reaction zone by azeotropic distillation.

5. Process for the manufacture of saccharide derivatives, comprising converting an alcohol of the cyclopentanopolyhydrophenanthrene series into a corresponding saccharide derivative by means of an acylhalogeno-saccharide in the presence of an inert solvent which forms azeotropic mixtures with the volatile cleavage products formed during the reaction, and in the presence of an agent which binds hydrohalic acids, the volatile cleavage products which are formed during the reaction being continually and permanently removed from the reaction zone by azeotropic distillation.

6. Process for the manufacture of saccharide derivatives, comprising converting desoxycorticosterone into the corresponding glucoside by means of acetobrom-glucose in the presence of an inert solvent which forms azeotropic mixtures with the volatile cleavage products formed during the reaction, and in the presence of silver carbonate, the water which is formed during the reaction being continually and permanently removed from the reaction zone by azeotropic distillation, and hydrolyzing the glucoside-tetra-acetate obtained.

7. Process for the manufacture of saccharide derivatives, comprising converting desoxycorticosterone into the corresponding maltoside by means of acetobrom-maltose in the presence of an inert solvent which forms azeotropic mixtures with the volatile cleavage products formed during the reaction, and in the presence of silver carbonate, the water which is formed during the reaction being continually and permanently removed from the reaction zone by azeotropic distillation, and hydrolyzing the maltoside-tetra-acetate obtained.

KARL MIESCHER.
CHARLES MEYSTRE.

REFERENCES CITED

The following references are of record in the file of this patent:

UNITED STATES PATENTS

| Number | Name | Date |
|---|---|---|
| 2,270,379 | Miescher et al. | Jan. 20, 1942 |

OTHER REFERENCES

Helv. Chim. Acta, vol. 26, (1943), pages 224–233 (10 pages). Published February 1, 1943.